United States Patent
Zhang (10) Patent No.: US 12,380,259 B1
(45) Date of Patent: Aug. 5, 2025

(54) METHODS FOR TOUGHENING OF FIBER-REINFORCED CONCRETE

(71) Applicant: WUHAN UNIVERSITY, Hubei (CN)

(72) Inventor: Duo Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 19/072,818

(22) Filed: Mar. 6, 2025

Related U.S. Application Data (63) Continuation of application No. PCT/CN2024/130540, filed on Nov. 7, 2024.

(30) Foreign Application Priority Data

Mar. 14, 2024 (CN) .......................... 202410292081.0

(51) Int. Cl.
*G06F 30/20* (2020.01)
*C04B 16/06* (2006.01)
*G06F 113/26* (2020.01)

(52) U.S. Cl.
CPC .............. *G06F 30/20* (2020.01); *C04B 16/06* (2013.01); *G06F 2113/26* (2020.01)

(58) Field of Classification Search
CPC ....... G06F 30/20; G06F 2113/26; C04B 16/06
See application file for complete search history.

(56) References Cited

U.S. PATENT DOCUMENTS

2012/0322921 A1    12/2012    Bracegirdle

FOREIGN PATENT DOCUMENTS

| CN | 107271257 | 10/2017 |
|---|---|---|
| CN | 109796167 | 5/2019 |
| CN | 109796168 | 5/2019 |
| CN | 111620608 | 9/2020 |
| CN | 111848020 | 10/2020 |
| CN | 113536208 | 10/2021 |
| CN | 116425480 | 7/2023 |
| CN | 118373636 | 7/2024 |
| KR | 20050018744 | 2/2005 |

OTHER PUBLICATIONS

Hou M, Zhang D, Li VC. Material processing, microstructure, and composite properties of low carbon Engineered Cementitious Composites (ECC). Cement and Concrete Composites. Nov. 1, 2022;134:104790. (Year: 2022).*

Hou M, Zhang D, Li VC. Crack width control and mechanical properties of low carbon engineered cementitious composites (ECC). Construction and Building Materials. Sep. 19, 2022;348:128692. (Year: 2022).*

(Continued)

*Primary Examiner* — Chuen-Meei Gan
(74) *Attorney, Agent, or Firm* — JCIP GLOBAL INC.

(57) ABSTRACT

A method for toughening of fiber-reinforced concrete in the field of concrete technologies is disclosed. The method comprises (1) design of mortar matrix; (2) design of ductile composite mortar with strain-hardening characteristic; (3) iterative design between the ductile composite mortar and aggregate; and (4) load-carrying capacity verification and optimization. In the process of external loading, mesoscale multiple cracking and strain-hardening behaviors are developed in the interstitial matrix between adjacent aggregate particles.

11 Claims, 4 Drawing Sheets

(56) References Cited

OTHER PUBLICATIONS

Zhang D, Zhu H, Hou M, Kurtis KE, Monteiro PJ, Li VC. Optimization of matrix viscosity improves polypropylene fiber dispersion and properties of engineered cementitious composites. Construction and Building Materials. Sep. 5, 2022;346:128459. (Year: 2022).*

Wang T, Zhang D, Zhu H, Ma B, Li VC. Durability and self-healing of engineered cementitious composites exposed to simulated sewage environments. Cement and Concrete Composites. May 1, 2022;129:104500. (Year: 2022).*

International Search Report (Form PCT/ISA/210) of PCT/CN2024/130540, mailed on Jan. 16, 2025, with English translation thereof, pp. 1-9.

"Written Opinion of the International Searching Authority (Form PCT/ISA/237) of PCT/CN2024/130540," mailed on Jan. 16, 2025, with English translation thereof, pp. 1-8.

* cited by examiner

METHODS FOR TOUGHENING OF FIBER-REINFORCED CONCRETE

CROSS-REFERENCE TO RELATED APPLICATION

This application is a continuation of international application of PCT application serial no. PCT/CN2024/130540, filed on Nov. 7, 2024, which claims the priority benefit of China application no. 202410292081.0, filed on Mar. 14, 2024. The entirety of each of the above-mentioned patent applications is hereby incorporated by reference herein and made a part of this specification.

TECHNICAL FIELD

The present disclosure relates to the field of concrete technologies, particularly a toughening method for fiber-reinforced concrete.

BACKGROUND

Cementitious materials such as concrete are a typical class of brittle solids and absorb energy mainly through brittle fracture during the material failure. This type of materials is generally strong in compression but weak in tension, thus prone to cracking throughout its service life. To improve the material's ductility, chopped fibers are added and distributed randomly into concrete to establish a fiber bridging effect on cracks. After a crack is initiated, additional energy can be absorbed through fiber debonding, pull-out, or rupture at the fiber/matrix interface, so that the strain capacity (as a measure of ductility) and the total energy absorption (as a measure of toughness) can be improved. This prompts the concept of fiber-reinforced concrete in the literature, which has gained broad applications in general engineering infrastructure.

The design method of conventional fiber-reinforced concrete involves two stages. First, a regular concrete matrix is designed based on the proper selection of aggregate grading, water-to-solid ratio, and binder type and usage. This stage is set to achieve a concrete mixture with a high density and compressive strength. Second, the type, geometry, and content of the fibers are determined for the enhancement of concrete ductility and toughness while fulfilling the requirement of workability and cost efficiency. These two stages are mutually independent, and the goal is to improve concrete toughness through fiber bridging of microcracks.

For example, Patent No. CN111620608A discloses an ultrahigh-toughness cementitious composite and its design method. The grading of its constituent is first determined for various water-to-cement ratios based on the particle packing model to develop candidate matrix compositions. Thereafter, the content of the fibers with a high aspect ratio is varied, and the preferred group with the minimum fiber content is selected in the condition that the requirement of compressive strength is fulfilled. The fibers are then partially substituted by those with a relatively low aspect ratio, and the composite flexural strength is tested at various substitution levels. The fractions of the high- and low-aspect-ratio fibers are then determined based on the total fiber content in the preferred group and the substitution level(s) while fulfilling the requirement of flexural strength. The ultrahigh-toughness cementitious composite is then prepared based on the mix design and the preferred contents of the fibers as determined for the preferred group(s).

From the perspective of fracture mechanics, the toughness improvement of conventional fiber-reinforced concrete mainly stems from three sources: 1) brittle fracture of the cementitious matrix, governed by the binder type and content; 2) crack bridging, deflection, and trapping by aggregates, governed by the grading, morphology, and content of aggregates; 3) fiber bridging of cracks, governed by the properties and content of fibers. The three mechanisms are superimposed in the toughness design for conventional fiber-reinforced concrete.

For example, Patent No. CN107271257A discloses a mix design method of Engineered Cementitious Composites (ECC) based on experimental micromechanics and fracture mechanics. The method involves the following steps: 1) Define the properties of the high-toughness cementitious composites; 2) Determine the parameters related to the fibers, such as the fiber type, length, and diameter, and determine parameters related to the matrix, such as mix constituents, matrix fracture toughness $K_m$, and modulus of elasticity $E_m$; 3) Determine the parameters related to the fiber/matrix interface, such as the frictional bond $\tau$, chemical bond Ga, slip-hardening coefficient $\beta$, and buffer factor g; 4) Determine the volume fraction of the fibers based on the parameters defined in the former steps and perform experimental validation regarding the target concrete properties. The ECC designed using the above method does not contain coarse aggregates. Essentially it is a fiber-reinforced ultra-ductile mortar with a high material cost, which accounts for a limitation for practical applications.

As described above, the conventional design method for fiber-reinforced concrete regards fibers as a passive reinforcement against the initiation and propagation of the main crack in the brittle concrete matrix. The fiber bridging effect is activated only after the main crack is initiated and then propagates until ultimate failure. This kind of material design results in a low toughening efficiency, as the composite toughness only builds on the energy absorption of the bridging fibers along the main crack.

This invention discloses a new design concept for fiber-reinforced concrete, where the fiber bridging effect acts both before and after the main crack is initiated. When the concrete is loaded, the main crack is proactively dissipated into multiple fine cracks to improve the efficiency of fiber utilization. The disclosed methods can effectively improve the composite toughness while maintaining a low cost for the production of fiber-reinforced concrete. It thus presents a meaningful pathway for the toughening design of fiber-reinforced concrete.

SUMMARY

Given the limitations of the prior art as stated above, this invention, in its first aspect, discloses a low-cost, high-efficiency, and scalable toughening design method for fiber-reinforced concrete, including the following steps:

(1) design of mortar matrix:
   determining a proportion of binder, sand, and water based on a required material compressive strength, and controlling a particle size $D_{50}$ of the sand being 0.1 mm to 4.75 mm and a sphericity of the sand being 0.3 to 0.9;
   determining a Mode I fracture toughness of the matrix; under a condition satisfying the required compressive strength, adjusting the proportion of constituents to control the Model I fracture toughness being 0.01 MPa·m$^{1/2}$ to 1.0 MPa·m$^{1/2}$;

(2) design of ductile composite mortar with strain-hardening characteristic:

combining the obtained mortar matrix and designing the ductile composite mortar based on a reinforced fiber, wherein a length of the fiber is 6-18 mm and a diameter of the fiber is 10-50 μm, a frictional bonding force between the fiber and the mortar matrix in a minimum standard is 0.8 MPa, and a chemical bonding force between the fiber and the mortar matrix is ≤1.5 J/m$^2$; a total volume content of the fiber is 1.5-2.5%, and the fiber is distributed uniformly in three dimensions in the mortar matrix;

conducting a notched direct tension test for the ductile composite mortar under a standard testing condition, wherein a fiber bridging force on cracks satisfies a stress and energy criteria for multiple cracking; adjusting a parameter of the mortar matrix and the fiber, wherein a tensile ductility of the ductile composite mortar in a minimum standard is 2%, and a maximum crack width before unloading is ≤50-300 μm;

(3) iterative design between the ductile composite mortar and aggregates:

selecting the aggregates, controlling a particle size $D_{50}$ of the aggregates being 4.75-50 mm and an average spacing of the aggregates in a minimum standard being 6 mm, wherein a content of the aggregates in a unitary volume of the fiber-reinforced concrete may be determined according to the average spacing of the aggregates;

according to an average spacing of actual aggregates, adjusting a design parameter of the length of the fiber in the ductile composite mortar to satisfy a design criterion of average spacing of aggregates>length of fiber;

mixing the ductile composite mortar with the aggregates, wherein a viscosity of the mortar matrix in a minimum standard is 8.0 Pas, and a uniform distribution coefficient of the aggregates in the composite mortar is 0.9;

(4) load-carrying capacity verification and optimization:

preparing the fiber-reinforced concrete required for a design based on the optimized proportion obtained by the former steps;

after standard curing the fiber-reinforced concrete to a specified age, determining a uniaxial compressive strength, a four-point bending ultimate strength, and a toughness; if the compressive strength does not satisfy a requirement of a load-carrying capacity, returning to the step (1) to adjust the constituents and the proportion in the mortar matrix, repeating the former steps until the load-carrying capacity satisfies the design requirement.

It can be seen that, by controlling the key parameters in each of the former steps, the disclosed composite concrete is designed to develop multiple cracking and fiber bridging at the micro-to-meso scale. This maximizes the energy absorption and delays the development and unstable propagation of the main crack. Consequently, the toughness of the fiber-reinforced concrete can be improved.

In Step (1), if the requirements for the $D_{50}$, sphericity, and Mode I fracture toughness are not fulfilled, the energy absorption during the matrix fracture would be overly high. This undermines the strain-hardening potential of the composite mortar and thus lowers its ductility. In Step (2), if the requirements for the fiber length, fiber diameter, fiber/matrix interfacial frictional and chemical bond, and fiber content are not fulfilled, the multiple cracking and strain-hardening potentials of the composite mortar would be undermined. This would lower the mortar ductility significantly and brings the material closer to brittle failure. Consequently, the material is reverted to traditional mortar and concrete. In Step (3), if the requirements for the tensile ductility and maximum crack width of the composite mortar are not fulfilled, the energy absorption of the composite mortar would be low. This results in a reduction in the material toughness and reverts to traditional fiber-reinforced concrete.

The design criterion "average spacing of aggregate>fiber length" is closely related to the variables involved in the disclosed design method. The minimum of 6 mm for the average spacing of aggregates is a necessary but insufficient condition for fulfilling the above criterion. To establish necessary and sufficient conditions, the actual fiber length should be taken into consideration when determining the spacing and particle size of the aggregates. Additionally, fulfilling the above criterion is necessary for harnessing the strain-hardening property of the composite mortar for toughening of fiber-reinforced concrete. If the criterion is not fulfilled, the orientation of the fibers in the composite mortar matrix would not distribute uniformly. Consequently, when the mortar matrix between adjacent aggregates is subjected to tension, the fiber bridging behavior cannot develop effectively, thus lowering the ductility, energy absorption, and the toughness of such-made fiber-reinforced concrete.

Preferably, in the step (1), a system of the binder includes at least one of ordinary Portland cement, Portland composite cement (i.e., blended Portland cements), alkali-activated binder (i.e., alkali-activated cements), carbonate blender (i.e., carbonate cements), and aluminate blender (i.e., aluminate cements).

Preferably, in the step (1), mineral additive may be added to the binder according to an application requirement for an improvement of workability and strength development.

Preferably, the mineral additive includes at least one of fly ash, silica fume, slag, metakaolin, and limestone powder.

Preferably, in the step (1), a type of the sand includes at least one of natural river sand, artificial manufactured sand, and artificial synthetic sand.

Preferably, in the Step (1), the water used is purified water meeting a water standard of concrete mixtures by ASTM C1602.

The testing condition of Mode I fracture toughness is flexible. It can be conducted conveniently using three-point bending on notched beams. Other relevant testing methods in this field can be used contingent upon available conditions.

Preferably, in the Step (2), a material type of the fiber includes at least one of polypropylene (PP), polyethylene (PE), polyvinyl alcohol (PVA), and polyethylene terephthalate (PET).

Occasionally, the frictional or chemical bond at the fiber/matrix interface does not fall in the above range. In these cases, fibers can be coated to restore the favorable interfacial bond.

Preferably, in the Step (2), the stress and energy criteria for multiple cracking is as follows: initial cracking strength of matrix (i.e., matrix first-cracking strength) ($\sigma_c$)<fiber bridging force on cracks (i.e, fiber bridging capacity) ($\sigma_0$), and fracture absorption energy of matrix (i.e., energy absorption during matrix fracture) ($J_{tip}$)<residual energy of fiber bridging force on cracks (i.e., fiber bridging complementary energy) ($J_b'$).

Preferably, the energy criterion for multiple cracking is a flat crack propagation mode of cracks. The formula is as follows:

$$\sigma_0 \delta_0 - \int_0^{\delta_0} \sigma(\delta) d\delta \equiv J_b' > J_{tip}$$

wherein $\sigma_0$ is the fiber bridging capacity, $\delta_0$ is the crack width corresponding to $\sigma_0$, $J_b'$ is the fiber bridging complementary energy, and $J_{tip}$ is the energy absorption during matrix fracture.

The fiber bridging complementary energy and the energy absorption during the matrix fracture (that is the matrix toughness at the crack tip) can be determined from the $\sigma(\delta)$ curve, which can be obtained using the single crack test.

Preferably, in the Step (3), a type of the aggregates includes at least one of basalt crushed stone, granite crushed stone, limestone crushed stone, pebbles, recycled aggregates, and artificial ceramsite.

Preferably, the aggregate is granite crushed stone (i.e., crushed granite), with a $D_{50}$ of 5-12.5 mm and average spacing of 12-20 mm.

In this field, aggregates can be approximated as ideal spheres. Therefore, their average spacing can be computed once their particle size and volume fraction are defined. The average spacing of aggregates can be estimated during material design, whereas in practice, for quality control, optical image analysis can be conducted on the cross section of the hardened concrete to obtain the statistics of the aggregate spacing.

Preferably, in the Step (3), when mixing the ductile composite mortar with aggregates, chemical or mineral additives may be added to adjust the matrix viscosity and the coefficient of uniformity for aggregate distribution.

Preferably, the chemical additives include at least one of water reducer (i.e., superplasticizer) and thickener (i.e., viscosity modifying agent), and the mineral additives include at least of one of silica fume and mineral fines.

In contrast to the conventional design of fiber-reinforced concrete, this invention discloses a new design concept, where the fiber bridging effect takes place both before and after the initiation of the main crack. The main crack is then dissipated into multiple fine cracks to promote the fiber utilization efficiency by involving the fibers on additional crack planes to resist the fracture. Based on this concept, the composite toughness can be improved significantly while maintaining a low material cost for the production of fiber-reinforced concrete.

In contrast to the design of ECC, this invention utilizes ECC as a mortar precursor to replace the brittle mortar and the fibers in conventional fiber-reinforced concrete. The resultant composite material has a comparable cost, but significantly higher toughness compared to conventional fiber-reinforced concrete. In other words, for the purpose of toughening fiber-reinforced concrete, the disclosed method integrates ECC with coarse aggregates, as opposed to mixes plain concrete with fibers in the conventional design of fiber-reinforced concrete.

As revealed by the above procedures, the disclosed method differs essentially from the conventional design of fiber-reinforced concrete, where the fibers are regarded as a crack control measure for regular concrete matrix. Conversely, the mortar matrix and the aggregates are designed independently in the disclosed method, with the fiber-reinforced mortar matrix first designed to manifest ultrahigh ductility and then combined with aggregates. By synergizing the design of the variables relevant to matrix and aggregates, the composite concrete is set to develop multiple cracking and fiber bridging effects at the micro-to-meso scale before the main crack forms. This maximizes the energy absorption and delays the formation and unstable propagation of the main crack. The design method can significantly improve the composite flexural toughness while enhancing its mechanical response during the softening stage of the flexural load-deflection curves. In this design framework, concrete formulations are split into mortar and aggregate, and the fibers are designed with the mortar excluding the coarse aggregates. This "fiber-mortar composite system" is optimized to achieve an ultra-ductile strain-hardening composite mortar matrix, which is then combined with aggregates to form the disclosed composite concrete system. Such designed fiber-reinforced concrete can adapt to the mixing and casting equipment of conventional concrete without the need for special hardware for industrial applications. The disclosed method also features a low cost and high toughening efficiency for the design and production of fiber-reinforced concrete.

In reference to conventional methods, the method disclosed in this invention has the following advantages:

This invention offers a design method for toughening of fiber-reinforced concrete. It can improve the material ductility and flexural toughness, while maintaining a low cost, high toughening efficiency, high accuracy, and broad applicability. The disclosed method also facilitates the material design and selection for fiber-reinforced concrete to be applied for earthquake and impact resistance.

Additionally, this invention offers a fiber-reinforced concrete, which can improve the material toughness by at least 15-50% at a constant fiber content while possessing sufficient compressive strength. This is achieved by adjusting the constituents, content, and mechanical properties of the composite mortar.

DESCRIPTION OF THE EMBODIMENTS

The invention is further illustrated using a set of examples but is not limited to these examples. For experimental conditions that are unspecified, regular methods, conditions, or product instructions are to be followed.

Information of the materials used in the following embodiments:

PVA fiber: Type RECS15, a short-chopped fiber made by industrial fiber spinning; the surface oil coating is expressed in mass percent;

River sand: a general-use material supplied on construction markets; the sphericity is 0.3-0.9;
Cement: Grade 42.5 Ordinary Portland cement.

Example 1

This example is based on the toughening design method of fiber-reinforced concrete to determine the parameters of the material system. In examining the criterion that "average spacing of aggregate>fiber length", this example adjusts the average spacing of aggregates, so that it is kept smaller than the fiber length and also is the smallest among all of the following 6 examples. Specimens are made accordingly.

The design parameters and preparation protocol of the fiber-reinforced concrete in this example are detailed as follows:

S1: Formulate ordinary Portland cement, fly ash, and river sand ($D_{50}$=212 μm) at a mass ratio of 1:2.2:1.16. Mix with water at a mass ratio of 1:0.18 to obtain a homogeneous mortar.

S2: Add 2 vol % of the PVA fibers to the mortar. The fiber has a length of 8 mm and diameter of 39 μm. The fiber is oil-coated by 1.5% to achieve desired frictional and chemical bond. Mix thoroughly to distribute PVA fibers uniformly to obtain the ductile composite mortar.

S3: Add crushed basalt aggregate to the ductile composite mortar at a volume fraction of 30%. The aggregate has a single particle size of 5 mm. Mix the ductile composite mortar with aggregates, and ensure that the viscosity of the mortar matrix and the coefficient of aggregate distribution are within the required range. After casting into the desired geometry, the specimens are cured under standard condition for 14 d.

Example 2

This example is basically consistent with Example 1. The main difference is that the average spacing of the aggregates is close to the fiber length for this example.

The design parameters and preparation protocol of the fiber-reinforced concrete in this example are detailed as follows:

S1: Formulate ordinary Portland cement, fly ash, and river sand ($D_{50}$=212 μm) at a mass ratio of 1:2.2:1.16. Mix with water at a mass ratio of 1:0.18 to obtain a homogeneous mortar.

S2: Add 2 vol % of the PVA fibers to the mortar. The fiber has a length of 8 mm and diameter of 39 μm. The fiber is oil-coated by 1.5% to achieve desired frictional and chemical bond. Mix thoroughly to distribute PVA fibers uniformly to obtain the ductile composite mortar.

S3: Add crushed basalt aggregate to the ductile composite mortar at a volume fraction of 30%. The aggregate has a particle size of 5-10 mm. Mix the ductile composite mortar with aggregates, and ensure that the viscosity of the mortar matrix and the coefficient of aggregate distribution are within the required range. After casting into the desired geometry, the specimens are cured under standard condition for 28 d.

Example 3

This example is basically consistent with Example 1. The main difference is that the average spacing of the aggregates is the largest among the 6 examples and is significantly larger than the fiber length.

The design parameters and preparation protocol of the fiber-reinforced concrete in this example are detailed as follows:

S1: Formulate ordinary Portland cement, fly ash, and river sand ($D_{50}$=212 μm) at a mass ratio of 1:2.2:1.16. Mix with water at a mass ratio of 1:0.18 to obtain a homogeneous mortar.

S2: Add 2 vol % of the PVA fibers to the mortar. The fiber has a length of 8 mm and diameter of 39 μm. The fiber is oil-coated by 1.5% to achieve desired frictional and chemical bond. Mix thoroughly to distribute PVA fibers uniformly to obtain the ductile composite mortar.

S3: Add crushed basalt aggregate to the ductile composite mortar at a volume fraction of 30%. The aggregate has a single particle size of 22 mm. Mix the ductile composite mortar with aggregates, and ensure that the viscosity of the mortar matrix and the coefficient of aggregate distribution are within the required range. After casting into the desired geometry, the specimens are cured under standard condition for 14 d.

Example 4

This example is basically consistent with Example 1. The main difference is that the average spacing of the aggregates is larger than the fiber length.

The design parameters and preparation protocol of the fiber-reinforced concrete in this example are detailed as follows:

S1: Formulate ordinary Portland cement, fly ash, and river sand ($D_{50}$=212 μm) at a mass ratio of 1:2.2:1.16. Mix with water at a mass ratio of 1:0.18 to obtain a homogeneous mortar.

S2: Add 2 vol % of the PVA fibers to the mortar. The fiber has a length of 8 mm and diameter of 39 μm. The fiber is oil-coated by 1.5% to achieve desired frictional and chemical bond. Mix thoroughly to distribute PVA fibers uniformly to obtain the ductile composite mortar.

S3: Add crushed basalt aggregate to the ductile composite mortar at a volume fraction of 40%. The aggregate has a particle size of 5-20 mm. Mix the ductile composite mortar with aggregates, and ensure that the viscosity of the mortar matrix and the coefficient of aggregate distribution are within the required range. After casting into the desired geometry, the specimens are cured under standard condition for 3 d.

Example 5

This example is basically consistent with Example 1. The main difference is that the average spacing of the aggregates is significantly larger than the fiber length.

The design parameters and preparation protocol of the fiber-reinforced concrete in this example are detailed as follows:

S1: Formulate ordinary Portland cement, fly ash, and river sand ($D_{50}$=212 μm) at a mass ratio of 1:2.2:1.16. Mix with water at a mass ratio of 1:0.18 to obtain a homogeneous mortar.

S2: Add 2 vol % of the PVA fibers to the mortar. The fiber has a length of 8 mm and diameter of 39 μm. The fiber is oil-coated by 1.5% to achieve desired frictional and chemical bond. Mix thoroughly to distribute PVA fibers uniformly to obtain the ductile composite mortar.

S3: Add crushed basalt aggregate to the ductile composite mortar at a volume fraction of 40%. The aggregate has a single particle size of 22 mm. Mix the ductile composite mortar with aggregates, and ensure that the viscosity of the mortar matrix and the coefficient of aggregate distribution are within the required range. After casting into the desired geometry, the specimens are cured under standard condition for 3 d.

Example 6

This example is basically consistent with Example 1. The main difference is that the average spacing of the aggregates is larger than the fiber length.

The design parameters and preparation protocol of the fiber-reinforced concrete in this example are detailed as follows:

S1: Formulate ordinary Portland cement, fly ash, and river sand ($D_{50}$=212 μm) at a mass ratio of 1:5:0.5. Mix with water at a mass ratio of 1:0.18 to obtain a homogeneous mortar.

S2: Add 2 vol % of the PVA fibers to the mortar. The fiber has a length of 8 mm and diameter of 39 μm. The fiber is oil-coated by 1.5% to achieve desired frictional and chemical bond. Mix thoroughly to distribute PVA fibers uniformly to obtain the ductile composite mortar.

S3: Add crushed basalt aggregate to the ductile composite mortar at a volume fraction of 40%. The aggregate has a particle size of 5-20 mm. Mix the ductile composite mortar with aggregates, and ensure that the viscosity of the mortar matrix and the coefficient of aggregate distribution are within the required range. After casting into the desired geometry, the specimens are cured under standard condition for 28 d.

Comparative Example 1

The protocol for preparing fiber-reinforced concrete in this comparative example group is as follows:

S1: Formulate ordinary Portland cement, fly ash, and river sand at a mass ratio of 1.0:2.2:1.16. Add crushed basalt aggregate at a volume fraction of 30%. The aggregate has a particle size of 5-10 mm. Mix with water at a mass ratio of 1:0.18.

S2: Add 2 vol % of the PVA fibers. The fiber has a length of 30 mm and diameter of 660 μm. Mix thoroughly and cast into the desired geometry. The specimens are cured under standard condition for 28 d.

Comparative Example 2

The protocol for preparing fiber-reinforced concrete in this comparative example group is as follows:

S1: Formulate ordinary Portland cement, fly ash, and river sand at a mass ratio of 1.0:2.2:1.16. Add crushed basalt aggregate at a volume fraction of 30%. The aggregate has a single particle size of 5 mm. Mix with water at a mass ratio of 1:0.18.

S2: Add 2 vol % of the PVA fibers. The fiber has a length of 30 mm and diameter of 660 μm. Mix thoroughly and cast into the desired geometry. The specimens are cured under standard condition for 14 d.

Comparative Example 3

The protocol for preparing fiber-reinforced concrete in this comparative example group is as follows:

S1: Formulate ordinary Portland cement, fly ash, and river sand at a mass ratio of 1.0:2.2:1.16. Add crushed basalt aggregate at a volume fraction of 30%. The aggregate has a single particle size of 22 mm. Mix with water at a mass ratio of 1:0.18.

S2: Add 2 vol % of the PVA fibers. The fiber has a length of 30 mm and diameter of 660 μm. Mix thoroughly and cast into the desired geometry. The specimens are cured under standard condition for 14 d.

Figure 1:
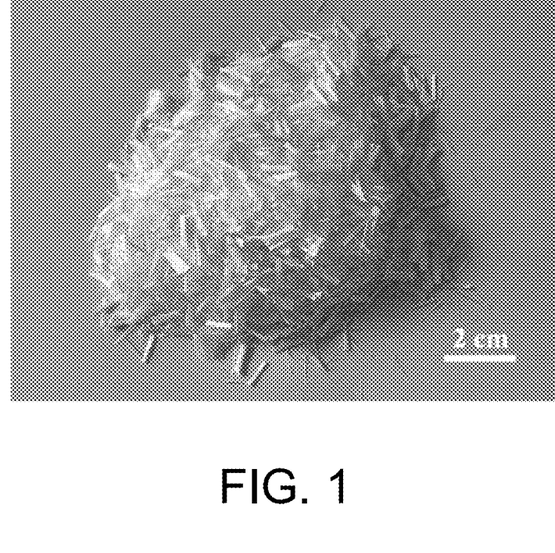
FIG. 1 presents an image of the PVA fibers used in the examples.
Figure 2:
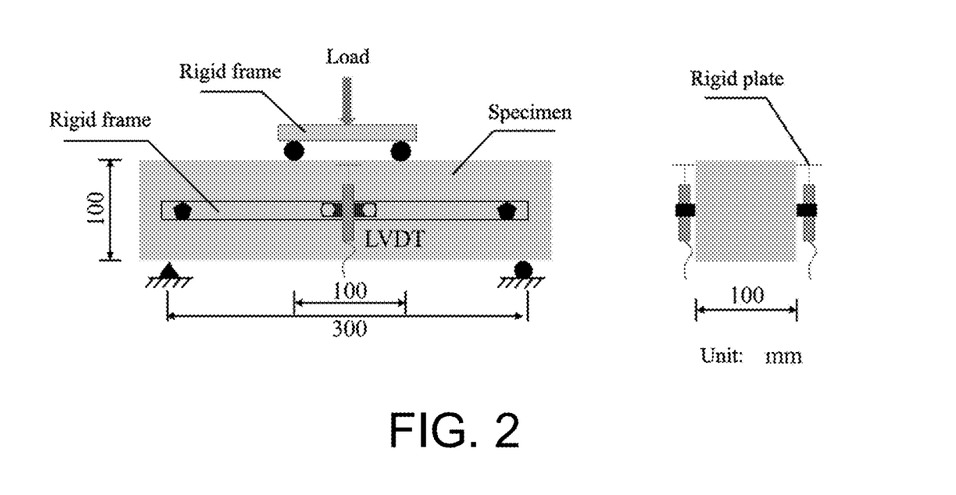
FIG. 2 illustrates a case of the experimental setup for determining flexural strength and toughness of fiber-reinforced concrete.

Four-point bending tests were performed on the specimens prepared in the above example and comparative example groups using the setup illustrated in FIG. 2. The obtained load-deflection curves are analyzed to compute the mechanical parameters such as flexural toughness. The material properties are determined as follows:

1) The first-cracking load is determined as the first zero-slope point on the load-deflection curve, denoted as $P_1$. When $P_1$ equals the ultimate load, the flexural properties are defined in FIG. 3. When $P_1$ is lower than the ultimate load, the flexural properties are defined in FIG. 4.

Figure 3:
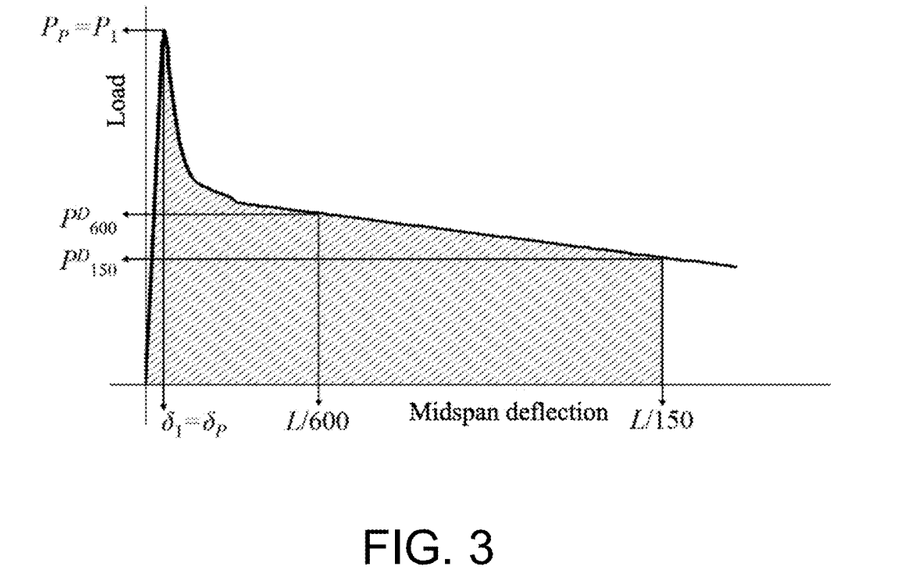
FIG. 3 illustrates the determination of flexural toughness parameters in Case 1.
Figure 4:
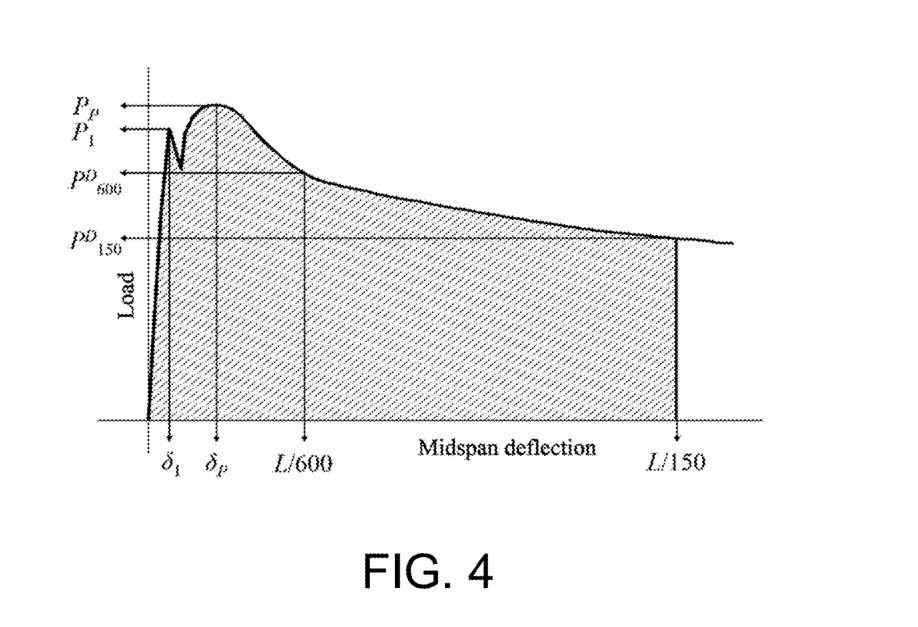
FIG. 4 illustrates the determination of flexural toughness parameters in Case 2.

2) The first-cracking strength fi and ultimate strength $f_p$ are then calculated using the following equation:

$$f = \frac{PL}{bd^2}$$

where f is strength in MPa, P is load in kN, L is the span length in mm, b is the average width of the specimen in mm, d is the average depth of the specimen in mm.

3) The midspan deflections corresponding to the first cracking strength $\delta_1$ and ultimate strength $\delta_p$ are determined from the load-deflection curve.

4) Determine the residual load corresponding to the deflections of L/600 and L/150, denoted as $P^D_{600}$ and $P^D_{150}$, respectively. Determine the residual strength using the above equation, denoted as $f^D_{600}$ and $f^D_{150}$, respectively.

5) Determine the area under the load-deflection curve until a deflection of L/150, denoted as $T^D_{150}$, or flexural toughness J.

6) Determine the effective flexural strength based on the flexural toughness as follows:

$$f^D_{e,150} = \frac{150 \cdot T^D_{150}}{bd^2}$$

7) Determine the effective strength ratio based on the first-cracking strength as follows:

$$R^D_{T,150} = \frac{f^D_{e,150}}{f_1} \cdot 100\%$$

The results of the above analysis can be obtained for Examples 1-6 (i.e., E1 to E6) and Comparative Examples 1-3 (i.e., C1 to C3). The results are listed in Table 1:

TABLE 1

| Parameters | E1 | E2 | E3 | E4 | E5 | E6 | C1 | C2 | C3 |
|---|---|---|---|---|---|---|---|---|---|
| First-cracking load, $P_1$/kN | 12.53 | 16.77 | 11.67 | 10.59 | 9.28 | 15.26 | 17.14 | 13.27 | 9.78 |
| First-cracking strength, $f_1$/MPa | 3.76 | 5.03 | 3.50 | 3.20 | 2.78 | 4.58 | 5.14 | 3.98 | 2.94 |
| First-cracking deflection, $\delta_1$/mm | 0.01 | 0.039 | 0.03 | 0.06 | 0.01 | 0.62 | 0.04 | 0.04 | 0.04 |
| Ultimate load, $P_P$/kN | 12.53 | 18.84 | 12.14 | 11.55 | 11.86 | 15.26 | 17.14 | 13.27 | 9.78 |
| Ultimate strength, fp/MPa | 3.76 | 5.65 | 3.64 | 3.46 | 3.55 | 4.58 | 5.14 | 3.98 | 2.94 |
| Deflection at the ultimate load, $\delta p$/mm | 0.01 | 0.45 | 0.41 | 0.41 | 0.56 | 0.62 | 0.04 | 0.04 | 0.04 |
| Residual load, $P^D_{600}$/kN | 9.32 | 18.08 | 11.93 | 11.26 | 11.73 | 14.53 | 7.16 | 6.72 | 5.19 |
| Residual strength, $f^D_{600}$/MPa | 2.80 | 5.42 | 3.58 | 3.38 | 3.52 | 4.36 | 2.15 | 2.01 | 1.56 |
| Residual load, $P^D_{150}$/kN | 2.42 | 2.44 | 5.34 | 5.30 | 7.10 | 3.93 | 2.50 | 3.55 | 5.00 |
| Residual strength, $f^D_{150}$/MPa | 0.72 | 0.73 | 1.60 | 1.59 | 2.13 | 1.18 | 0.75 | 1.07 | 1.50 |
| Flexural toughness, $T^D_{150}$/J | 12 | 16 | 19 | 14 | 16 | 17 | 12 | 11 | 11 |
| Effective flexural strength, $f^D_{e,150}$/MPa | 1.80 | 2.40 | 2.85 | 2.11 | 2.40 | 2.55 | 1.80 | 1.65 | 1.65 |
| Ratio of effective flexural strength to first-cracking strength, $R^D_{T,150}$/% | 47.9% | 47.7% | 81.4% | 66.1% | 86.2% | 55.7% | 35.0% | 41.4% | 56.2% |

By analyzing the flexural toughness and effective flexural strength of Examples 1-6 shown in the above table, the disclosed method is proved to improve the efficiency of fiber utilization for concrete toughening without altering the fiber content. In Examples 2-6, where the criterion of "fiber length<average spacing of aggregate" is fulfilled, the flexural toughness and effective flexural strength of Example 2 are improved by at least 30% compared to the comparative example; the flexural toughness and effective flexural strength of Example 3 are improved by at least 50% compared to the comparative example; the flexural toughness and effective flexural strength of Example 4 are improved by at least 15% compared to the comparative example; the flexural toughness and effective flexural strength of Example 5 are improved by at least 30% compared to the reference; the flexural toughness and effective flexural strength of Example 6 are improved by at least 40% compared to the comparative example. The toughness improvement is related to the fulfillment of the criterion of "fiber length<average spacing of aggregate", as evidenced by the results in Examples 3 and 1.

Figure 5:
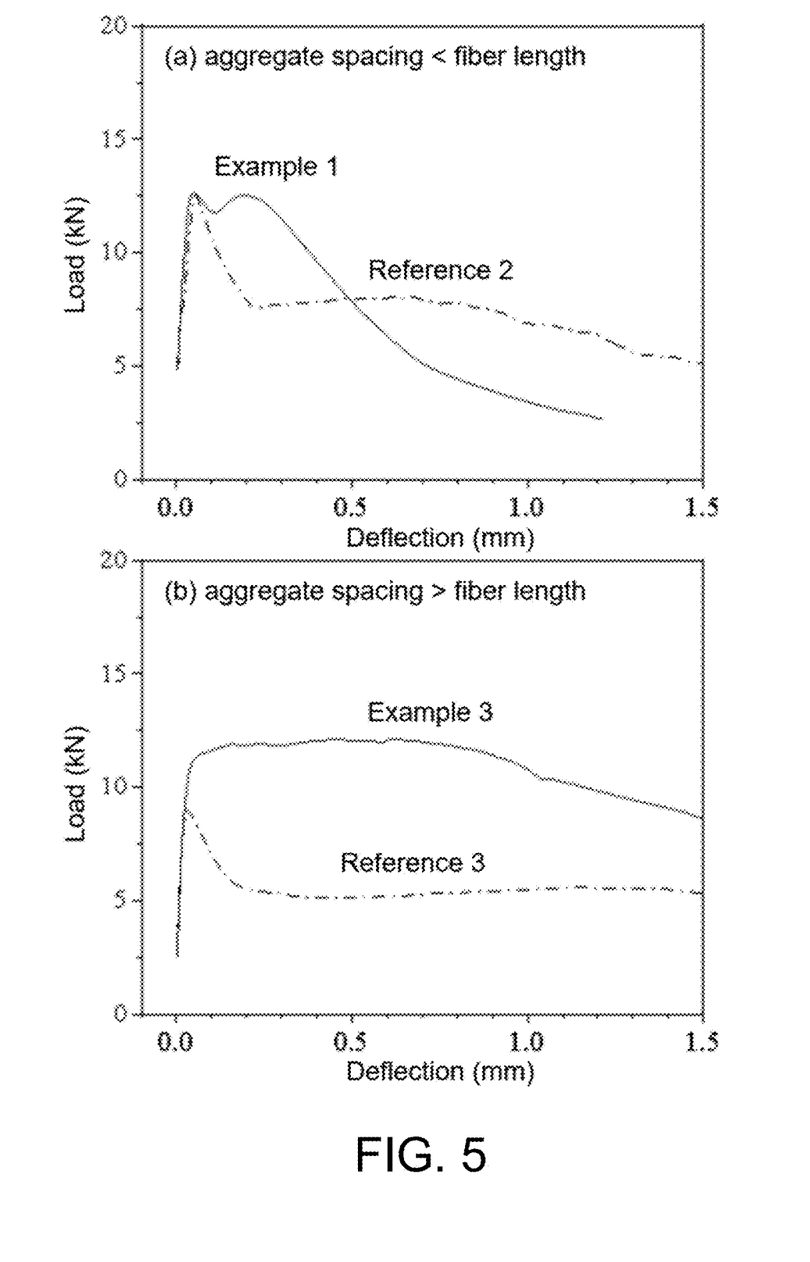
FIG. 5 compares the typical flexural load-to-deflection relationships of fiber-reinforced concrete designed using the disclosed method versus conventional method: (a) comparison between Example 1 and Comparative Example 2; (b) comparison between Example 3 and Comparative Example 3.
Figure 6:
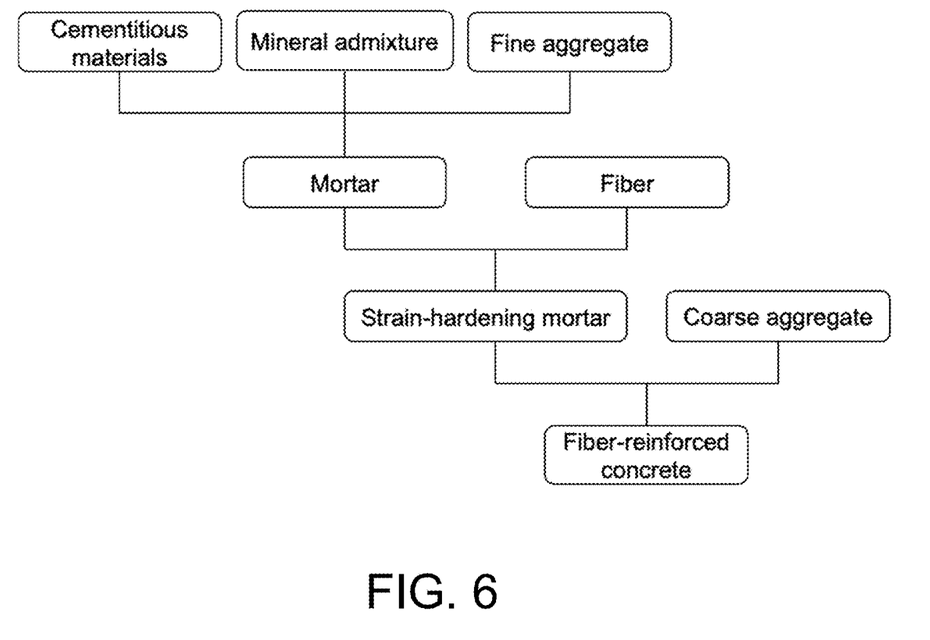
FIG. 6 summarizes the design protocol of the fiber-reinforced concrete disclosed in this invention.

FIG. 5 is comprised of (a) and (b). It shows the load-deflection curves of the fiber-reinforced concrete designed using this method and conventional method under various conditions. In FIG. 5, (a) shows the load-deflection curves in the case of "average spacing of aggregate<fiber length". The solid line indicates the results of Example 1 while the dash line indicates that of the traditional fiber-reinforced concrete in Comparative Example 2. In FIG. 5, (b) shows the load-deflection curves in the case of "average spacing of aggregate>fiber length". The solid line indicates the results of Example 3 while the dash line indicates that of the traditional fiber-reinforced concrete in Comparative Example 3. It can be found that the fiber-reinforced concrete designed using the present and conventional methods manifest drastically different behaviors in the softening stage passing the peak load. After the peak load, the load-carrying capacity decreases rapidly for conventional fiber-reinforced concrete (Comparative Examples 2 and 3) but slowly for the specimens designed using the disclosed method (Examples 1 and 3). When the criterion of "average spacing of aggregate>fiber length" is fulfilled, the specimens manifest a deflection-hardening behavior. Compared to conventional fiber-reinforced concrete, the disclosed method improves the material's flexural toughness significantly without altering the fiber content (see detailed data in Table 1). These results suggest that the disclosed design method can effectively improve the fiber utilization efficiency and toughening efficiency, while enhancing the accuracy for toughening design.

The disclosed method also altered the passive crack control designed for conventional fiber-reinforced concrete. When subjected to external load, the main crack can be dissipated proactively into multiple microcracks at the mesoscale. This absorbs the mechanical energy imposed by external loads and disperses it into the steady propagation of microcracks and the debonding and friction at the fiber/matrix interface. The above process can improve the energy absorption significantly, and the mesoscale multiple cracking also improves the material ductility in a more efficient manner compared to conventional fiber-reinforced concrete.

The disclosed method increases the fiber utilization efficiency and concrete toughening efficiency, as the action of the fibers is changed from the bridging of the main crack in conventional fiber-reinforced concrete to the bridging of multiple microcracks in the disclosed system. Therefore, at the same fiber content, the composite toughness can be improved more efficiently, and the area under the stress-strain curves in the softening stage can be increased. As revealed by one or multiple of the examples in this invention, the flexural toughness of the fiber-reinforced concrete can be increased by at least 15%. When the criterion "average spacing of aggregate>fiber length" is fulfilled, the flexural toughness of the fiber-reinforced concrete can be increased by at least 30%.

The disclosed method also increased the accuracy in the design of fiber-reinforced concrete. The micromechanical variables related to the design of the ductile composite mortar are introduced to the toughening design of fiber-reinforced concrete. Upon the reception of sufficient empirical data, the flexural toughness of the composite concrete can be predicted effectively. This would aid in the material design and selection of fiber-reinforced concrete to be applied for earthquake and impact resistance.

Given the above, the design method disclosed in this invention can leverage a higher efficiency in fiber utilization and concrete toughness improvement compared to the conventional design of fiber-reinforced concrete. It also improves the accuracy for the material design.

The above descriptions present the preferred embodiments of this invention. It should be noted that modifications and variations can be made by skilled persons in the field without creative labors in accordance with the present invention. Hence, any technical solution that can be obtained by logical analysis, reasoning or limited experimentation by a person skilled in the field on the basis of the prior art in accordance with the concept of the present invention shall be within the scope of protection determined by the claims.

What is claimed is:

1. A design method for toughening of fiber-reinforced concrete, comprising the following steps:
   (1) design of mortar matrix:
   determining a proportion of binder, sand, and water based on a required material compressive strength, and controlling a particle size $D_{50}$ of the sand being 0.1 mm to 4.75 mm and a sphericity of the sand being 0.3 to 0.9;
   determining a Mode I fracture toughness of the matrix; under a condition satisfying the required compressive strength, adjusting the proportion of constituents to control the Model I fracture toughness being 0.01 MPa·m$^{1/2}$ to 1.0 MPa·m$^{1/2}$;
   (2) design of ductile composite mortar with strain-hardening characteristic:
   combining the obtained mortar matrix and designing the ductile composite mortar based on a reinforced fiber, wherein a length of the fiber is 6-18 mm and a diameter of the fiber is 10-50 μm, a frictional bonding force between the fiber and the mortar matrix in a minimum standard is 0.8 MPa, and a chemical bonding force between the fiber and the mortar matrix is ≤1.5 J/m$^2$; a total volume content of the fiber is 1.5-2.5%, and the fiber is distributed uniformly in three dimensions in the mortar matrix;
   conducting a notched direct tension test for the ductile composite mortar under a standard testing condition, wherein a fiber bridging force on cracks satisfies a stress and energy criteria for multiple cracking; adjusting a parameter of the mortar matrix and the fiber, wherein a tensile ductility of the ductile composite mortar in a minimum standard is 2%, and a maximum crack width before unloading is ≤50-300 μm;
   (3) iterative design between the ductile composite mortar and aggregates:
   selecting the aggregates, controlling a particle size $D_{50}$ of the aggregates being 4.75-50 mm and an average spacing of the aggregates in a minimum standard being 6 mm, wherein a content of the aggregates in a unitary volume of the fiber-reinforced concrete may be determined according to the average spacing of the aggregates;
   according to an average spacing of actual aggregates, adjusting a design parameter of the length of the fiber in the ductile composite mortar to satisfy a design criterion of average spacing of aggregates>length of fiber;
   mixing the ductile composite mortar with the aggregates, wherein a viscosity of the mortar matrix in a minimum standard is 8.0 Pa·s, and a uniform distribution coefficient of the aggregates in the composite mortar is 0.9; and
   (4) load-carrying capacity verification and optimization:
   preparing the fiber-reinforced concrete required for a design based on the optimized proportion obtained by the former steps;
   until after standard curing the fiber-reinforced concrete to a specified age, determining a uniaxial compressive strength, a four-point bending ultimate strength, and a toughness; if the compressive strength does not satisfy a requirement of a load-carrying capacity, returning to the step (1) to adjust the constituents and the proportion in the mortar matrix, repeating the former steps until the load-carrying capacity satisfies the design requirement,
   wherein under a basis of satisfying the requirements of various compressive strength grades of existing concrete, a material toughness is increased by at least 15~50%.

2. The method according to claim 1, wherein in the step (1), a system of the binder includes at least one of ordinary Portland cement, Portland composite cement, alkali-activated binder, carbonate blender, and aluminate blender.

3. The method according to claim 1, wherein in the step (1), mineral additive may be added to the binder according to an application requirement for an improvement of workability and strength development; and the mineral additive includes at least one of fly ash, silica fume, slag, metakaolin, and limestone powder.

4. The method according to claim 1, wherein in the step (1), a type of the sand includes at least one of natural river sand, artificial manufactured sand, and artificial synthetic sand; and the water used is purified water meeting a water standard of concrete mixtures.

5. The method according to claim 1, wherein in the step (2), a material type of the fiber includes at least one of polyethylene, polypropylene, polyvinyl alcohol, and polyethylene terephthalate.

6. The method according to claim 1, wherein in the step (2), the stress and energy criteria for multiple cracking is as follows: initial cracking strength of matrix<fiber bridging force on cracks; and fracture absorption energy of matrix<residual energy of fiber bridging force on cracks.

7. The method according to claim 6, wherein the energy criterion for multiple cracking is a flat crack propagation mode of cracks with the following formula:

$$\sigma_0\delta_0 - \int_0^{\delta_0}\sigma(\delta)d\delta \equiv J_b' > J_{tip}$$

wherein $\sigma_0$ is fiber bridging force on cracks; $\delta_0$ is crack width corresponding to $\sigma_0$; $J_b'$ is residual energy of fiber bridging force on cracks; and $J_{tip}$ is fracture absorption energy of matrix.

8. The method according to claim 1, wherein in the step (3), a type of the aggregates includes at least one of basalt crushed stone, granite crushed stone, limestone crushed stone, pebbles, recycled aggregates, and artificial ceramsite.

9. The method according to claim 1, wherein in the step (3), when mixing the ductile composite mortar with the aggregates, chemical additive or mineral additive may be added to adjust the viscosity of the matrix and the uniform distribution coefficient.

10. The method according to claim 9, wherein the chemical additive includes at least one of water reducer and thickener; and the mineral additive includes at least of one of silica fume and mineral fines.

11. The method according to claim 1, wherein in the step (3), the particle size $D_{50}$ of the aggregates is one or more of 4.75-50 mm, 4.75-40 mm, 4.75-80 mm, and 4.75-120 mm, and the aggregates used are one of continuous gradation or single gradation;

according to the average spacing of actual aggregates, the design parameter of the length of the fiber in the ductile composite mortar is adjusted, when the length of the fiber is smaller than 6 mm, the average spacing of the aggregates can be 0-6 mm to satisfy the design criterion of average spacing of aggregates>length of fiber.

* * * * *